(12) United States Patent
Ishiguro et al.

(10) Patent No.: US 7,556,245 B2
(45) Date of Patent: Jul. 7, 2009

(54) ACTIVE VIBRATION ISOLATING SUPPORT APPARATUS

(75) Inventors: Tetsuya Ishiguro, Saitama (JP); Hirotomi Nemoto, Saitama (JP); Hideyuki Okamoto, Saitama (JP)

(73) Assignee: Honda Motor Co., LTD., Tokyo (JP)

( * ) Notice: Subject to any disclaimer, the term of this patent is extended or adjusted under 35 U.S.C. 154(b) by 381 days.

(21) Appl. No.: 11/324,046

(22) Filed: Dec. 30, 2005

(65) Prior Publication Data
US 2006/0186308 A1    Aug. 24, 2006

(30) Foreign Application Priority Data
Jan. 11, 2005    (JP)    ............... 2005-003861

(51) Int. Cl.
*F16M 13/00*    (2006.01)
(52) U.S. Cl. ............... 267/140.14; 267/140.15
(58) Field of Classification Search .. 267/140.11–141.7
See application file for complete search history.

(56) References Cited

U.S. PATENT DOCUMENTS

| | | | | |
|---|---|---|---|---|
| 5,360,080 | A * | 11/1994 | Yamazaki | ............... 180/300 |
| 6,254,069 | B1 * | 7/2001 | Muramatsu et al. | .... 267/140.14 |
| 6,445,149 | B1 * | 9/2002 | Muramatsu et al. | ......... 318/114 |
| 6,459,970 | B2 * | 10/2002 | Goto et al. | ............... 701/36 |
| 6,631,895 | B2 | 10/2003 | Nemoto | |
| 2004/0188904 | A1 * | 9/2004 | Ichikawa et al. | ....... 267/140.14 |
| 2005/0248070 | A1 | 11/2005 | Ichikawa et al. | |

FOREIGN PATENT DOCUMENTS

| | | |
|---|---|---|
| JP | 06-109071 | 4/1994 |
| JP | 2000-010638 | 1/2000 |
| JP | 2002-139095 | 5/2002 |

\* cited by examiner

*Primary Examiner*—Xuan Lan Nguyen
(74) *Attorney, Agent, or Firm*—Carrier, Blackman & Assocaites, PC.; Joseph P. Carrier; William D. Blackman

(57) ABSTRACT

When driving an actuator 41 of an active vibration isolating support apparatus M to extend and contract on a predetermined cycle so as to suppress the transmission of vibrations of an engine, since a combined target current ICMDT is calculated by combining a primary target current which cancels a primary vibration of the engine with a secondary target current which cancels a secondary vibration of the engine and furthermore, the actuator 41 is driven with a target driving current ICMD in which a minimum value of the combined target current ICMDT is offset to 0, can the primary vibration and the secondary vibration of the engine be cancelled so as to enhance a vibration isolating function and the inclusion of a direct current component into the target driving current ICMD can be prevented so as to suppress a wasteful heat release of the actuator 41 to a minimum level.

11 Claims, 5 Drawing Sheets

ACTIVE VIBRATION ISOLATING SUPPORT APPARATUS

BACKGROUND OF THE INVENTION

The present invention relates to an active vibration isolating support apparatus which bears the load of a vibrating unit and suppresses the transmission of vibration by driving an actuator to extend and contract on a predetermined cycle with a current which corresponds to a primary vibration of the vibrating unit through control by a control unit.

An active vibration isolating support apparatus or active vibration isolating support apparatus is known in Patent Document No. 1 below which supports an engine on a body of an automobile and suppresses the transmission of primary vibration of the engine by supplying a sinusoidal current for an actuator so as to displace the actuator in a sinusoidal fashion.

[Patent Document No. 1]

JP-A-2002-139095

Incidentally, engine vibrations include, in addition to a primary vibration having a period corresponding to the number of cylinders, vibrations of higher order than the primary vibration such as a secondary vibration and a tertiary vibration. However, since the suppression of such higher-order vibrations is not taken into consideration in the aforesaid conventional active vibration isolating support apparatus, there has been caused a problem that a sufficient vibration isolating effect cannot be obtained.

In addition, while it is considered that both the primary vibration and the higher-order vibration are suppressed by driving the actuator of the active vibration isolating support apparatus with a target current resulting by combining a primary target current which cancels the primary vibration and a higher-order target current which cancels the higher-order vibration, since phases of the primary vibration and the higher-order vibration deviate from each other, even in the event that a minimum value of the primary target current is made to be 0, a then minimum value of the higher-order does not become 0. Consequently, a minimum value of the target current resulting from the combination of the primary target current and the higher-order target current does not become 0, leading to a possibility that a direct current component rides on the target current to thereby increase the heat release value of the actuator wastefully.

SUMMARY OF THE INVENTION

The invention is made in view of the situations, and an object thereof is to enhance the vibration transmission suppression effect while suppressing a wasteful heat release from an actuator of an active vibration isolating support apparatus.

With a view to attaining the object, according to a preferred aspect of the invention, there is proposed an active vibration isolating support apparatus for bearing a load of a vibrating unit and suppressing the transmission of vibration by driving an actuator to extend and contract on a predetermined cycle with a current which corresponds to a primary vibration of the vibrating unit through control by a control unit, wherein the control unit calculates a combined target current by combining a primary target current which synchronizes with the predetermined cycle and a secondary target current which cancels a secondary vibration of the vibrating unit and drives the actuator with a target driving current in which a minimum value of the combined target current is offset to 0.

Note that an electro control unit U in an embodiment below corresponds to the control unit of the invention.

Namely, according to a first aspect of the invention, there is provided with an active vibration isolating support apparatus for bearing a load of a vibrating unit and suppressing the transmission of vibration, the active vibration isolating support apparatus including: a control unit (U), and an actuator (41), wherein the actuator (41) is driven to extend and contract on a predetermined cycle with a current which corresponds to a primary vibration of the vibrating unit through control by the control unit (U), and the control unit (U) calculates a combined target current (ICMDT) by combining a primary target current which synchronizes with the predetermined cycle and a higher-order target current which cancels a higher-order vibration of the vibrating unit, and drives the actuator (41) with a target driving current (ICMD) in which a minimum value of the combined target current (ICMDT) is offset to 0.

According to a second aspect of the invention, there is provided with the active vibration isolating support apparatus according to the first aspect of the invention, wherein the higher-order target current is a secondary target current which cancels a secondary vibration of the vibration unit.

According to a third aspect of the invention, there is provided with an active vibration isolating support apparatus for bearing a load of a vibrating unit and suppressing the transmission of vibration, the active vibration isolating support apparatus including: a control unit (U), and an actuator (41), wherein the actuator (41) is driven to extend and contract on a predetermined cycle with a current which corresponds to a primary vibration of the vibrating unit through control by the control unit (U), the control unit (U) calculates a combined target current (ICMDT) by combining a primary target current which synchronizes with the predetermined cycle and a higher-order target current which cancels a higher-order vibration of the vibrating unit, and a period of a waveform of the combined target current ICMDT is divided into a predetermined number of segments, and a second smallest value of current values of the respective segments is set to be zero.

According to the preferred aspect of the invention, when suppressing the transmission of vibration of the vibrating unit by driving the actuator of the active vibration isolating support apparatus to extend and contract on the predetermined cycle, since the combined target current is calculated by combining the primary target current which cancels the primary vibration of the vibrating unit with the secondary target current which cancels the secondary vibration of the vibrating unit, and furthermore, the actuator is driven with the target driving current in which the minimum value of the combined target current is offset to 0, not only can the primary vibration and secondary vibration of the vibrating unit be cancelled to thereby enhance the vibration isolating function but also the direct current component can be prevented from being included in the target driving current to thereby suppress the wasteful heat release of the actuator to a minimum level.

DETAILED DESCRIPTION OF THE PREFERRED EMBODIMENTS

Hereinafter, a mode for carrying out the invention will be described based on an embodiment illustrated in the accompanying drawings.

Figure 1:
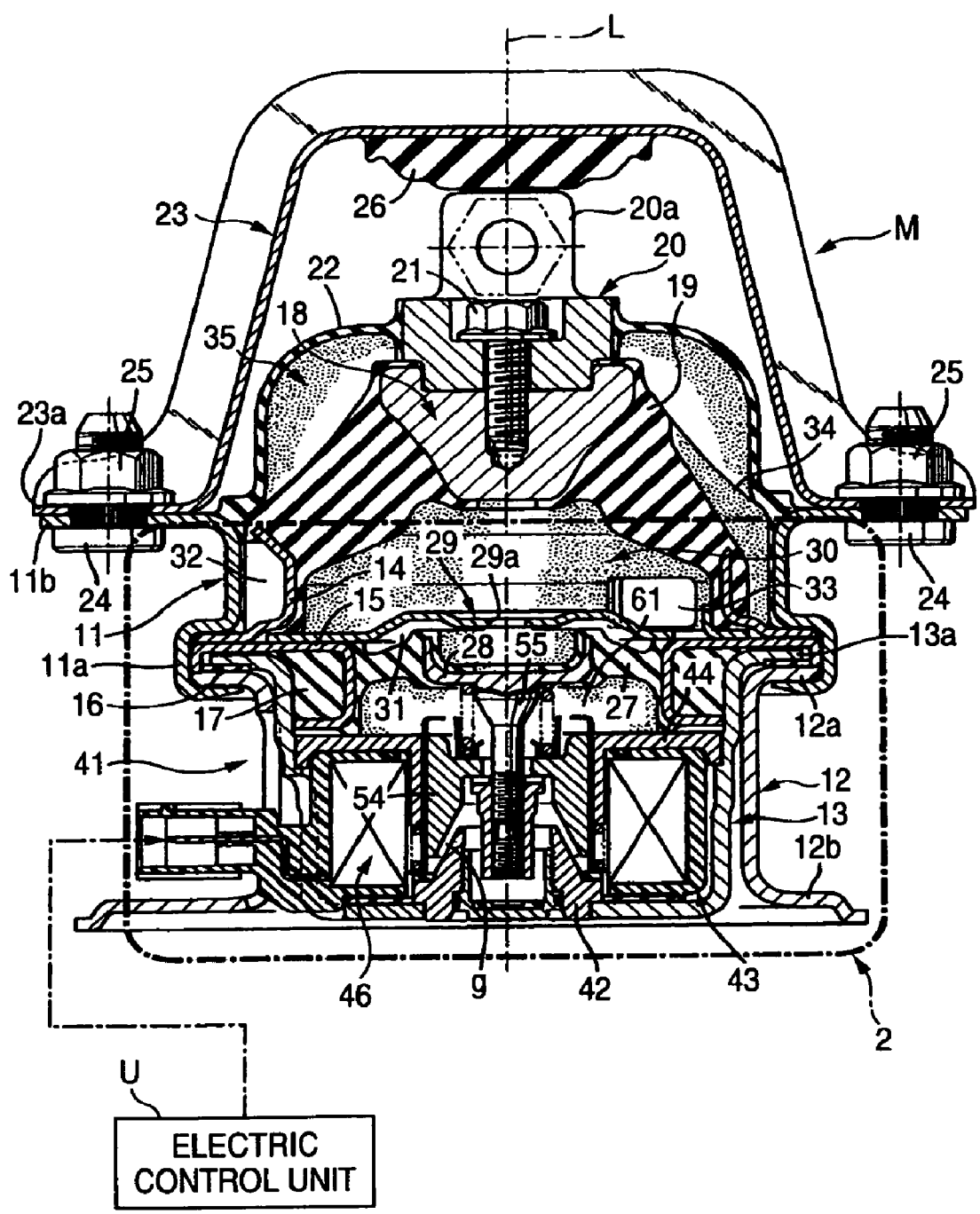
FIG. 1 is a vertical sectional view of an active vibration isolating support apparatus.
Figure 2:
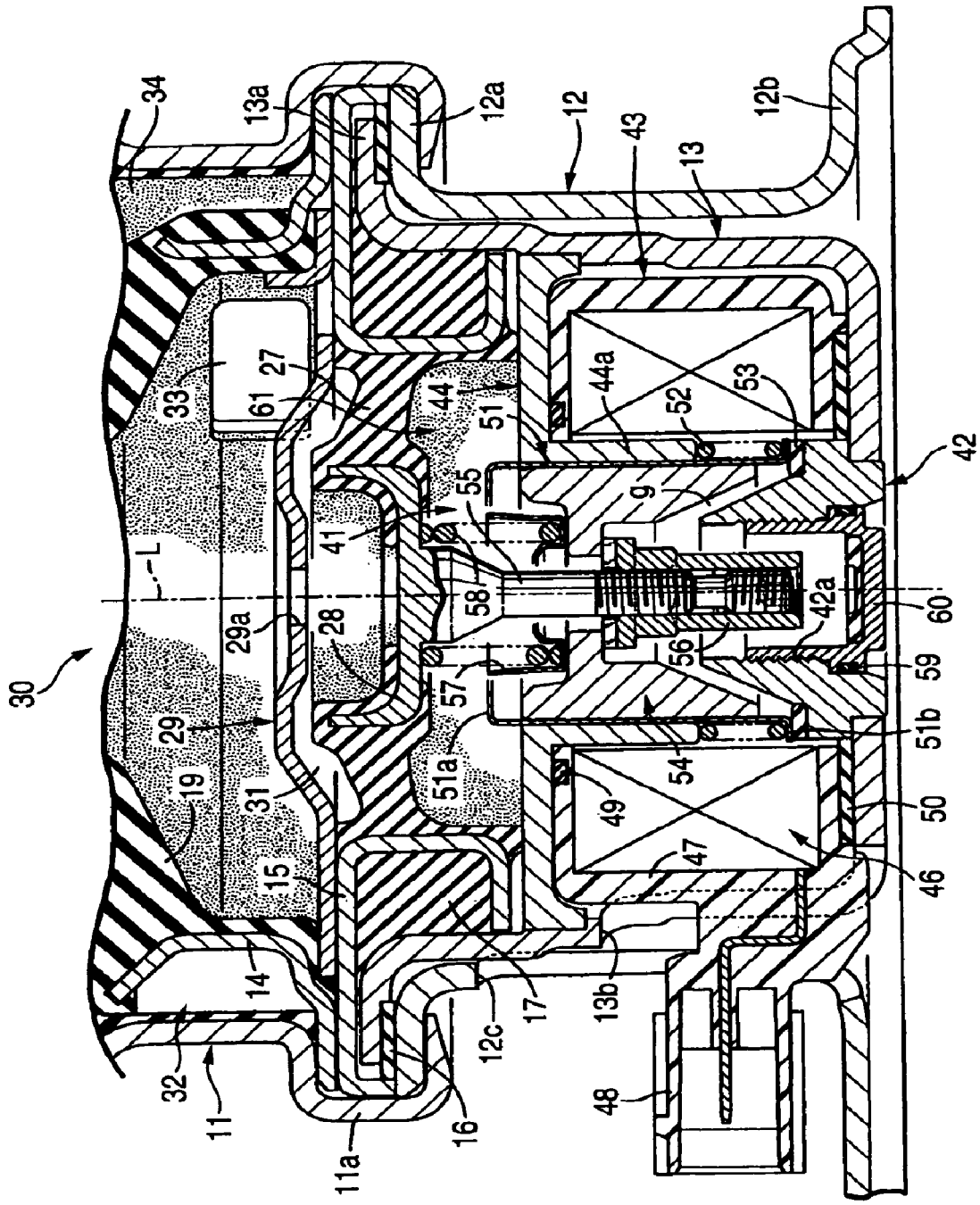
FIG. 2 is an enlarged view of a portion of FIG. 1 which is indicated by reference numeral 2.
Figure 3:
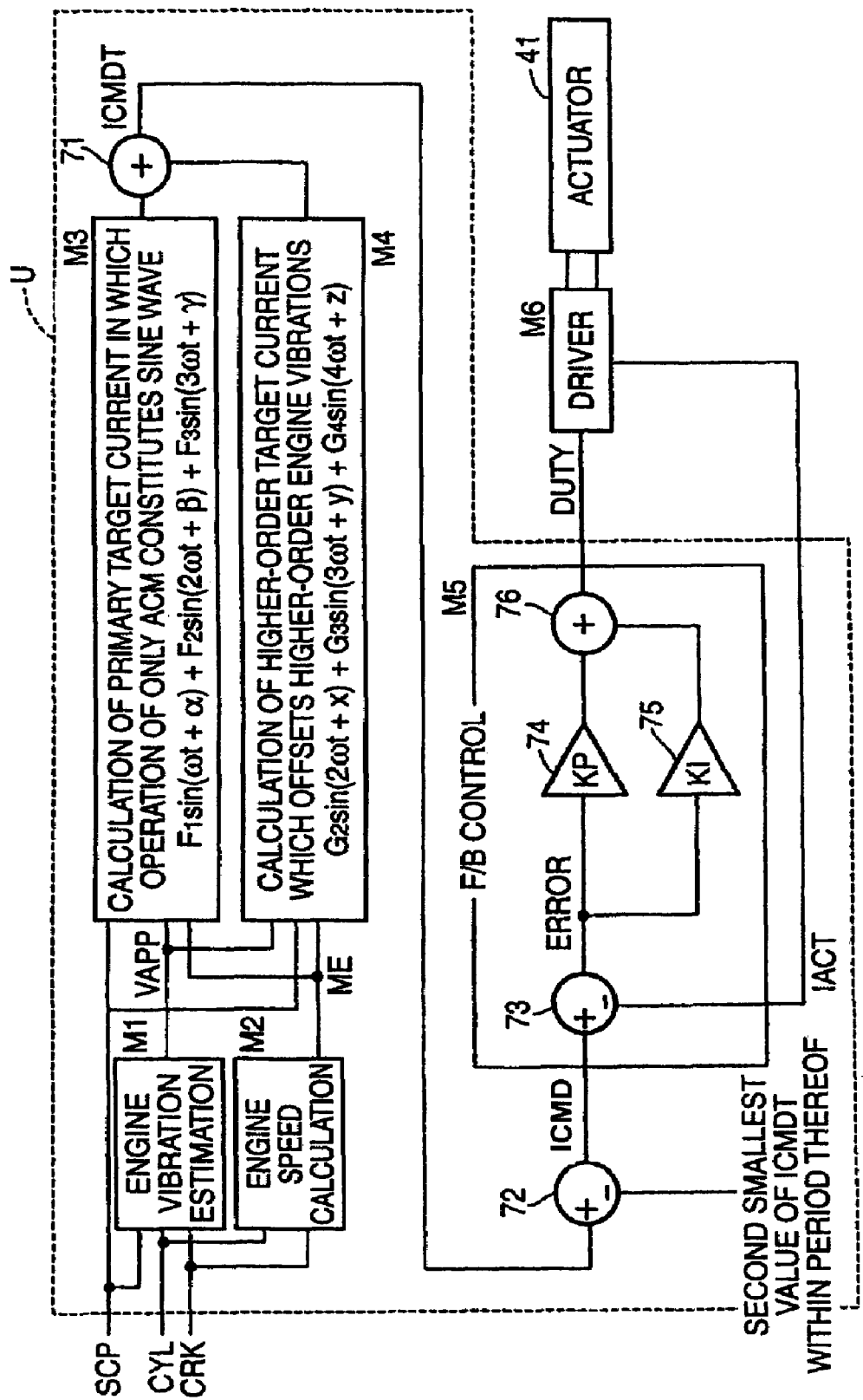
FIG. 3 is a block diagram which shows a circuit configuration of an electronic control unit.
Figure 4:
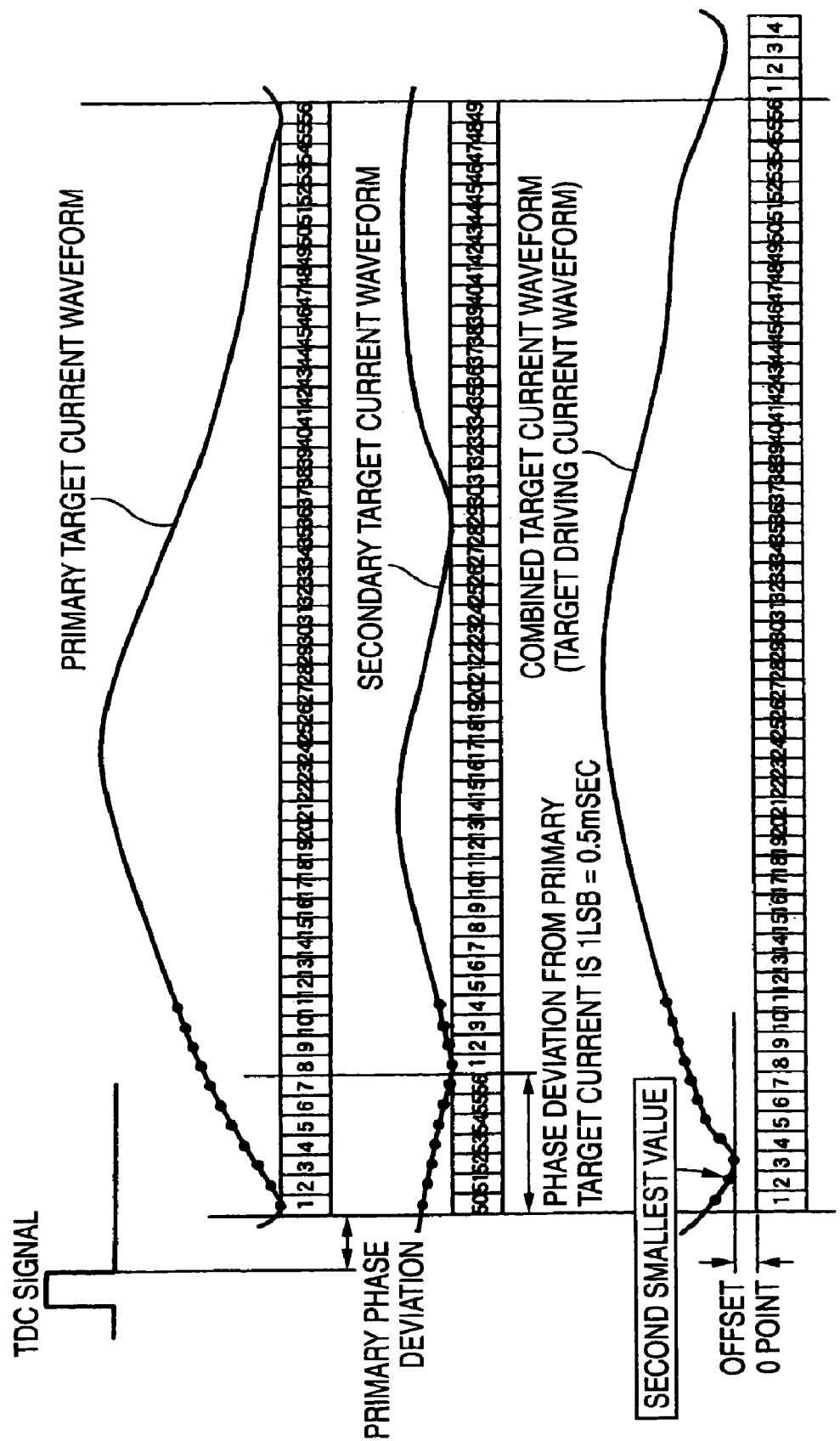
FIG. 4 is an explanatory diagram which explains a process of calculating a target driving current.

FIGS. 1 to 4 show an embodiment of the invention, in which FIG. 1 is a vertical sectional view of an active vibration isolating support apparatus, FIG. 2 is an enlarged view of a portion of FIG. 1 which is indicated by reference numeral 2, FIG. 3 is a block diagram which shows a circuit configuration of an electronic control unit, and FIG. 4 is an explanatory diagram which explains a process of calculating a target driving current.

As shown in FIGS. 1 and 2, an active vibration isolating support apparatus M or an active vibration isolating support apparatus, which is used to elastically support an engine on a body frame of an automobile, is such as to have a construction which is substantially symmetrical with respect to an axis L, and an outer circumferential flange portion 13a of a generally cut-shaped actuator case 13 which is made open on an upper side thereof, an outer circumferential portion of a primary annular elastic support ring 14 and an outer circumferential portion of a secondary annular elastic support ring 15 are superposed on each other between a lower end flange portion 11a of a generally cylindrical upper housing 11 and an upper end flange portion 12a of a generally cylindrical lower housing 12 and are then connected together by virtue of crimping. As this occurs, a primary annular floating rubber 16 is interposed between the flange portion 12a of the lower housing 12 and the flange portion 13a of the actuator case 13 and a secondary annular floating rubber 17 is interposed between an upper portion of the actuator case 13 and an inner surface of the secondary elastic support ring 15, whereby the actuator case 13 is supported in a floating fashion so as to move relative to the upper housing 11 and the lower housing 12.

An upper end and a lower end of a primary elastic unit 19 made of a thick rubber are joined, respectively, to the primary elastic support ring 14 and a primary elastic support boss 18 disposed on the axis L by virtue of vulcanization bonding. A diaphragm support boss 20 is fixed to an upper surface of the primary elastic support boss 18 with a bolt 21, and a diaphragm 22, which is joined to an inner circumferential portion of the diaphragm support boss 20 at an inner circumferential portion thereof by virtue of vulcanization bonding, is joined to the upper housing 11 at an outer circumferential portion thereof by virtue of vulcanization bonding. An engine mount portion 20a, which is integrally formed on an upper surface of the diaphragm support boss 20, is fixed to an engine, not shown. In addition, a body mount portion 12b at a lower end of the lower housing 12 is fixed to the body frame, not shown.

A lower end flange portion 23a of a stopper member 23 is connected to an upper end flange portion 11b of the upper housing 11 with bolts 24 . . . and nuts 25 . . . , and the engine mount portion 20a provided on the upper surface of the diaphragm support boss 20 in such a manner as to project therefrom is made to oppositely face a stopper rubber 26 attached to an inner surface of an upper portion of the stopper member 23 in such a manner as to be brought into abutment therewith. When a large load is inputted into the active vibration isolating support apparatus M, the engine mount portion 20a is brought into abutment with the stopper rubber 26, whereby an excessive displacement of the engine is suppressed.

An outer circumferential portion of a secondary elastic unit 27 made of a membrane-shaped rubber is joined to the secondary elastic support ring 15 by virtue of vulcanization bonding, and a movable member 28 is joined to the secondary elastic unit 27 by virtue of vulcanization bonding in such a manner as to be embedded in a central portion thereof. A disc-shaped bulkhead member 29 is fixed between an upper surface of the secondary elastic support ring 15 and an outer circumferential portion of the primary elastic unit 19, and a primary fluid chamber 30 defined by the bulkhead member 29 and the primary elastic unit 19 and a secondary fluid chamber 31 defined by the bulkhead member 29 and the secondary elastic unit 27 are made to communicate with each other via a communication hole 29a.

An annular communication path 32 is formed between the primary elastic support ring 14 and the upper housing 11, and one end of the communication path 32 is made to communicate with the primary fluid chamber 30 via a communication hole 33, whereas the other end of the communication path 32 is made to communicate with a tertiary fluid chamber 35 defined by the primary elastic unit 19 and the diaphragm 22 via a communication hole 34.

Next, the construction of an actuator 41 which drives the movable member 28 will be described.

A stationary core 42, a coil assembly 43 and a yoke 44 are mounted in an interior of the actuator case 13 sequentially in that order from the bottom to the top thereof. The coil assembly 43 is made up of a bobbinless coil 46 disposed between the stationary core 42 and the yoke 44 and a coil cover 47 which covers an outer circumference of the bobbinless coil 46. A connector 48 is integrally formed on the coil cover 47 in such a manner as to extend to the outside through openings 13b, 12c which are formed, respectively, in the actuator case 13 and the lower housing 12.

A seal member 49 is disposed between an upper surface of the coil cover 47 and a lower surface of the yoke 44, and a seal member 50 is disposed between a lower surface of the bobbinless coil 46 and an upper surface of the stationary core 42. The intrusion of water and dust from the openings 13b, 12c formed in the actuator case 13 and the lower housing 12 into an interior space 61 of the actuator 41 can be disrupted by means of these seal members 49, 50.

A thin cylindrical bearing member 51 is fitted in an inner circumferential surface of a cylindrical portion 44a of the yoke 44 in such a manner as to slide vertically, and an upper flange 51a, which is bent radially inwardly, is formed at an upper end of the bearing member 51, whereas a lower flange 51b, which is bent radially outwardly, is formed at a lower end thereof. A set spring 52 is disposed between the lower flange 51b and a lower end of the cylindrical portion 44a of the yoke 44 in a compressed state, and the lower flange 51b is pressed against the upper surface of the stationary core 42 via an elastic unit 53 by virtue of a spring-back force of the set spring 52, whereby the bearing member 51 is supported on the yoke 44.

A generally cylindrical movable core 54 is fitted in an inner circumferential surface of the bearing member 51 in such a manner as to slide vertically. A rod 55, which extends downwards from a center of the movable member 28, loosely passes through a center of the movable core 54, and a nut 56 is tightened to a lower end thereof. A set spring 58 is disposed between a spring seat 57 provided on an upper surface of the movable core 54 and a lower surface of the movable member 28 in a compressed state, and the movable core 54 is pressed against the nut 56 to thereby be fixed thereto by virtue of a spring-back force of the set spring 58. A lower surface of the movable core 54 and the upper surface of the stationary core 42 are made to oppositely face each other in this state via a conical air gap g. The rod 55 and the nut 56 are loosely fitted in an opening 42a formed at a center of the stationary core 42, and this opening 42a is closed with a plug 60 via a seal member 59.

An electronic control unit U, into which a crank pulse signal CRK that is outputted in association with the rotation of a crankshaft of the engine, a cam angle signal CYL that is outputted in association with the rotation of a camshaft of the engine and a cylinder-at-rest signal SCP are inputted, controls the energization of the actuator 41 of the active vibration isolating support apparatus M based on those crank pulse signal CRK, cam angle signal CYL and cylinder-at-rest signal SCP.

As shown in FIG. 3, the electronic control unit U includes an engine vibration estimating unit M1, an engine speed calculating unit M2, a primary target current calculating unit M3, a higher-order target current calculating unit M4 and a feedback control unit M5. In addition, the feedback control unit M5 is connected to the actuator 41 of the active vibration isolating support apparatus M via an actuator driver M6.

Next, the function of the embodiment of the invention will be described.

When engine shake vibrations of low frequency are generated while an automobile is running, the primary elastic unit 19 is deformed by a load inputted from the engine via the diaphragm support boss 20 and the primary elastic support boss 18, and the volume of the primary fluid chamber 30 is changed, whereby fluid communicates between the primary fluid chamber 30 and the tertiary fluid chamber 35 which are connected to each other via the communication path 32. While the volume of the tertiary fluid chamber 35 is contracted and expanded according to the expansion and contraction of the volume of the primary fluid chamber 30, the variation in volume of the tertiary fluid chamber 35 is absorbed by the elastic deformation of the diaphragm 22. As this occurs, since the shape and dimensions of the communication path 32 and the spring constant of the primary elastic unit 19 are set so as to exhibit a low spring constant and a high damping force in a low frequency area of the engine shake vibrations, vibrations transmitted from the engine to the body frame can effectively be reduced.

Note that the actuator 41 is rendered inoperative in the low frequency area of the engine shake vibrations.

When vibrations of higher frequency than the engine shake vibrations, that is, vibrations attributed to the rotation of the crankshaft of the engine at idle and vibrations with the cylinders at rest are generated, since a fluid within the communication path 32 which connects the primary fluid chamber 30 and the tertiary fluid chamber 35 together is put in a stick state and hence cannot fulfill the vibration isolating function, the actuator 41 is driven to perform the vibration isolating function.

In order to actuate the actuator 41 of the active vibration isolating support apparatus M so as to perform the vibration isolating function, the electronic control unit U controls the energization of the bobbinless coil 46 based on crank pulse signal CRK, cam angle signal CYL and cylinder-at-rest signal SCP.

Namely, when bobbinless coil 46 of the actuator 41 is timed to be energized in synchronism with a reduction in volume of the primary fluid chamber 30 which is triggered when the engine moves downwards relative to the body frame to thereby deform downwards the primary elastic unit 19, the movable core 54 moves downwards towards the stationary core 42 by virtue of a sucking force generated in the air gap g, whereby the secondary elastic unit 27 is pulled down by the movable member 28 connected to the movable core 54 via the rod 55 to thereby be deformed downwards. As a result, since the volume of the secondary fluid chamber 31 is increased, fluid in the primary fluid chamber 30 which is compressed by the load from the engine flows into the secondary fluid chamber 31 through the communication hole 29a in the bulkhead member 29, whereby the load transmitted from the engine to the body frame can be reduced.

Then, when the bobbinless coil 46 of the actuator 41 is timed to be de-energized in synchronism with an increase in volume of the primary fluid chamber 30 which is triggered when the engine moves upwards relative to the body frame to thereby deform upwards the primary elastic unit 19, the sucking force generated in the air gap g is lost, whereby the movable core 54 can move freely. Due to this, the secondary elastic unit 27, which is now deformed downwards, is allowed to expand upwardly to thereby restore its original configuration. As a result, since the volume of the secondary fluid chamber 31 is reduced, fluid in the secondary fluid chamber 31 flows into the primary fluid chamber 30 through the communication hole 29a in the bulkhead member 29, whereby the engine can be permitted to move upwards relative to the body frame.

Thus, an active vibration controlling force can be generated which prevents the transmission of engine vibrations to the body frame by energizing and de-energizing the bobbinless coil 46 of the actuator 41 in accordance with the periods of vibrations of the engine.

Figure 5:
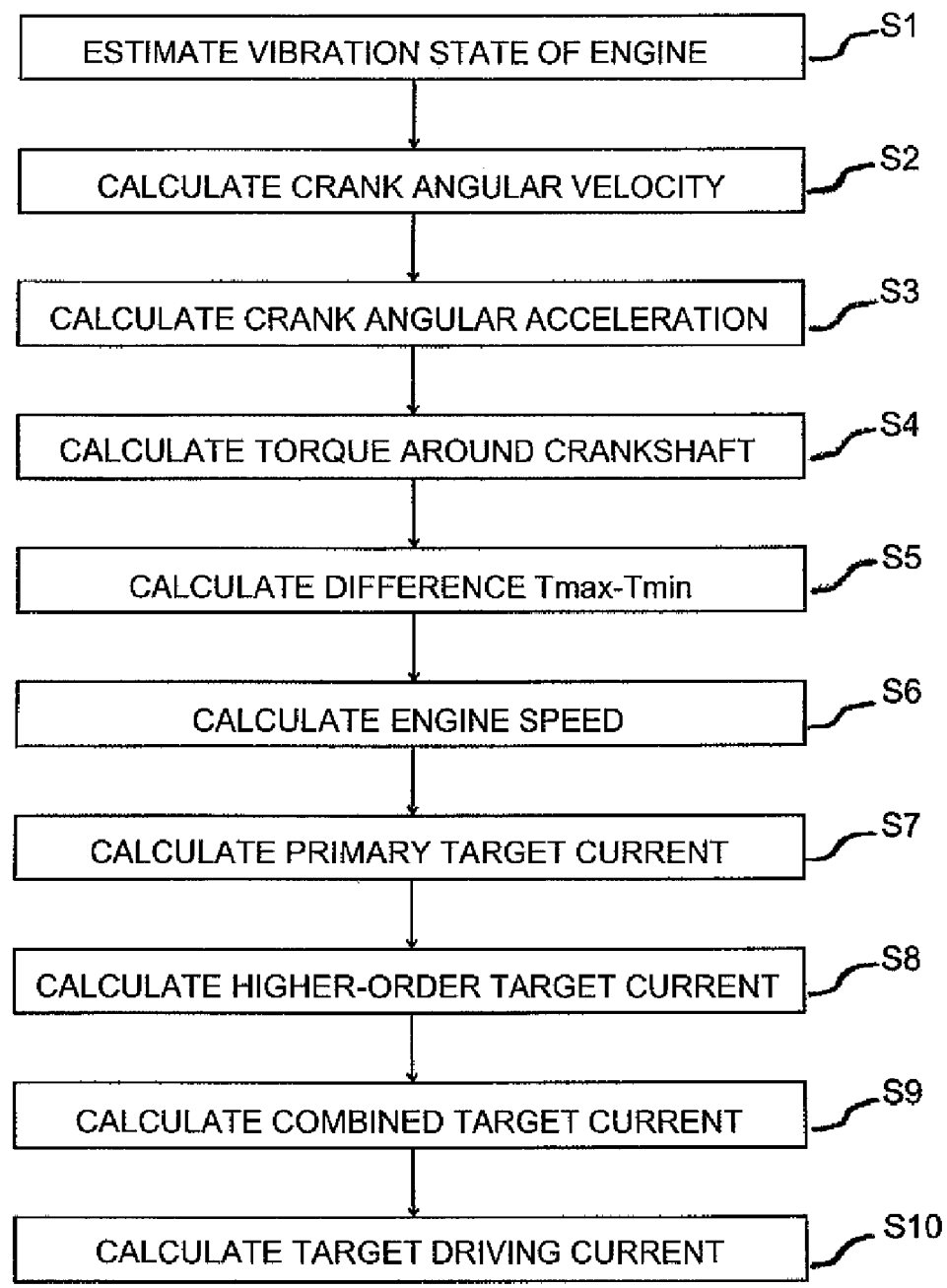
FIG. 5 is a flowchart of a method for calculating a target driving current according to an embodiment of the present invention.

Next, a method for calculating a target driving current that is to be supplied for the bobbinless coil 46 of the actuator 41 will be described based on FIGS. 3-5.

At step S1 the engine vibration estimating unit M1 estimates a vibrating state of the engine based on crank pulse signal CRK, cam angle signal CYL and cylinder-at-rest signal. To be specific, a time interval of a crank pulse is calculated by comparing a crank pulse signal CRK that is outputted every predetermined crank angle with a specific cam angle signal CYL (a TDC signal of a specific cylinder). Following this, at step S2 a crank angular velocity $\omega$ is calculated by dividing the predetermined crank angle by the time interval of the crank pulse signal CRK, and furthermore, a crank angular acceleration $d\omega$ is calculated at step S3 by time differentiating the crank angular velocity $\omega$. Following this, at step S4 a torque Tq around the crankshaft of the engine is calculated from $$Tq = I \times d\omega/dt$$

where I is an inertia moment around the crankshaft of the engine. While this torque Tq becomes 0 on the assumption that the crankshaft rotates at a constant angular velocity $\omega$, since the angular velocity $\omega$ increases by virtue of the acceleration of the piston in an expansion stroke, whereas the angular velocity $\omega$ decreases by virtue of the deceleration of the piston to thereby generate a crank angular acceleration $d\omega/dt$, a torque Tq is to be generated which is in proportion to the crank angular acceleration $d\omega)/dt$.

Following this, a maximum value and a minimum value of an adjacent torque in terms of time are determined, at step S5 and a difference between the maximum value and the minimum value of the torque, that is, an amplitude at the position of the active vibration isolating support apparatus M which supports the engine is calculated as a variation of the torque, the amplitude so calculated constituting an estimated engine vibration VAPP. As this occurs, since the vibration state of the engine differs depending upon whether or not the cylinders are at rest, the engine vibration is corrected based on the cylinder-at-rest signal.

The engine speed calculating unit M2 calculates an engine speed ME based on crank pulse signal CRK and cam angle signal CYL, at step S6.

At Step S7, primary target current calculating unit M3 calculates a primary target current which generates a sinusoidal vibration controlling force which suppresses the primary vibration of the engine on the active vibration isolating support apparatus M based on the engine speed ME and the cylinder-at-rest signal SCP, and at step S8 the higher-order target current calculating unit M4 similarly calculates a higher-order target current which generates a sinusoidal vibration controlling force which suppresses the higher-order vibration of the engine on the active vibration isolating support apparatus M based on the engine vibration VAPP, the engine speed ME and the cylinder-at-rest signal SPC. An adding unit 71 calculates a combined target current ICMDT at step S9 which results from addition of the primary target current to the higher-order target current, and at step S10 a subtracting unit 72 calculates a target driving current ICMD by subtracting a correction value from the combined target current ICMDT.

As shown in FIG. 4, a phase where the current value of the primary target current becomes 0 deviates from the top dead center signal, and a phase where the current value of the higher-order target current becomes 0 deviates from the phase where the current value of the primary target current becomes 0. Due to the phase deviation between the primary target current and the higher-order target current, the minimum value of the combined target current ICMDT cannot decrease down to 0, producing a predetermined offset amount, i.e., a minimum current value between 0 point axis (X-axis) and an "OFFSET" line extending parallel to the 0 point axis (FIG. 4).

Then, in this embodiment, a period of a waveform of the combined target current ICMDT is divided into a predetermined number of segments (56 segments in this embodiment), and a second smallest value of current values of the respective segments is subtracted from the combined target current ICMDT as the correction value to thereby calculate the target driving current ICMD. The current value of the target driving current ICMD can be made to become 0 at two locations of a period thereof, whereby a direct current component can be prevented from riding on the target driving current ICMD in an ensured fashion to thereby suppress the wasteful heat release of the actuator 41 to a minimum level.

Returning to FIG. 3, an actual current IACT of the actuator 41 is subtracted from the target driving current ICMD inputted into the feedback control unit M5 at a subtracting unit 73, and a value resulting from an addition at an adding unit 76 of a feedback term P which results from a multiplication of a difference resulting from the subtraction by a term P gain 74 and a feedback term I which results from a multiplication of the difference by a term I gain 75 is outputted to the actuator driver M6 as a duty signal DUTY so as to drive the actuator 41, whereby a feedback control is carried out so that the actual current of the actuator 41 coincides with the target driving current ICMD.

Thus, since the combined target current ICMDT is calculated by combining the primary target current which cancels the primary vibration of the engine with the higher-order target current which cancels the higher-order vibration of the engine and furthermore, the actuator 41 is driven with the target driving current ICMD in which the minimum value of the combined target current ICMDT is offset to 0, both the primary vibration and the higher-order vibration of the engine can be cancelled so as to enhance the vibration isolating function, and moreover, the inclusion of the direct current component into the target driving current ICMD can be prevented so as to suppress the wasteful heat release of the actuator to the minimum level.

Thus, while the embodiment of the invention is described heretofore, the invention can be modified variously without departing from the spirit and scope thereof.

For example, while in the embodiment, the higher-order target current calculating unit M4 calculates the higher-order target current which suppresses vibrations of a plurality of orders which are equal to or higher than the secondary vibration of the engine, only the secondary target current vibration may be calculated which has a largest influence.

What is claimed is:

1. An active vibration isolating support apparatus for bearing a load of a vibrating unit and suppressing the transmission of vibration, the active vibration isolating support apparatus comprising:
   a control unit, and
   an actuator,
   wherein
   the actuator is driven to extend and contract on a predetermined cycle with a primary target current which corresponds to a primary vibration of the vibrating unit through control by the control unit,
   the control unit calculates a combined target current by combining said primary target current cancels a higher-order vibration of the vibrating unit, adjusts the combined target current by a predetermined amount so that a minimum value of the combined target current becomes 0, and drives the actuator with the adjusted combined target current.

2. The active vibration isolating support apparatus according to the claim 1, wherein
   the higher-order target current is a secondary target current which cancels a secondary vibration of the vibration unit.

3. The active vibration isolating support apparatus according to the claim 1, wherein a period of a waveform of the combined target current is divided into a predetermined number of segments, the predetermined amount is equal to a second lowest current value of current values of said segments and the combined target current is adjusted by subtracting the predetermined amount therefrom.

4. The active vibration isolating support apparatus according to the claim 1, wherein said vibrating unit is a power unit of a vehicle.

5. The active vibration isolating support apparatus according to the claim 1, wherein each of said primary target current and said higher-order target current generates a sinusoidal vibration controlling force.

6. The active vibration isolating support apparatus according to the claim 1, wherein a phase deviation exists between waveforms of said primary target current and said higher-order target current.

7. The active vibration isolating support apparatus according to the claim 1,
   wherein on a waveform, a difference of where the current value of the higher-order target current becomes zero and where the current value of the primary target current becomes zero defines a primary phase deviation.

8. An active vibration isolating support apparatus for bearing a load of a vibrating unit and suppressing the transmission of vibration, the active vibration isolating support apparatus comprising:

a control unit, and an actuator, wherein the actuator is driven to extend and contract on a predetermined cycle with a primary target current which corresponds to a primary vibration of the vibrating unit through control by the control unit, the control unit calculates a combined target current by combining a primary target current cancels a higher-order vibration of the vibrating unit, a period a waveform of the combined target current is divided into a predetermined number of segments, and the waveform of the combined target current is adjusted by an amount corresponding to a second smallest value of current values of the respective segments such that the second smallest value is adjusted to be zero.

9. A method of isolating active vibration of an engine mounted on an active vibration isolating support apparatus, said method comprising the steps of:

estimating a vibrating state of the engine based on a crank pulse signal, a cam angle signal, and a cylinder-at-rest signal;

calculating a crank angular velocity by dividing a predetermined crank angle by a time interval of said crank pulse signal;

calculating a crank angular acceleration by time differentiating said crank angular velocity;

calculating a torque around a crankshaft of the engine;

determining a difference between a maximum value and a minimum value of the torque;

calculating engine speed based on the crank pulse signal and the cam angle signal;

calculating a primary target current which generates a sinusoidal vibration controlling force for suppressing a primary vibration of the engine, based on the engine speed and the cylinder-at-rest signal;

calculating a higher-order target current which generates a sinusoidal vibration controlling force for suppressing a higher-order vibration of the engine, based on the engine vibration, the engine speed and the cylinder-at-rest signal;

calculating a combined target current by adding the primary target current and the higher-order target current;

adjusting the combined target current by a predetermined amount so that a minimum value of the combined target current becomes zero; and driving the actuator with the adjusted combined target current.

10. A method of isolating active vibration of an engine according to claim 9, wherein a period of a sinusoidal waveform of the combined target current is divided into a predetermined number of segments, the predetermined amount is equal to a second lowest current value of current values of said segments, and the combined target current is adjusted by subtracting the predetermined amount therefrom.

11. A method of isolating active vibration of an engine according to claim 9, wherein the higher-order vibration is a secondary vibration.

* * * * *